United States Patent
Gaughan et al.

(10) Patent No.: US 7,823,181 B2
(45) Date of Patent: *Oct. 26, 2010

(54) WEB TELEVISION HAVING A TWO-WAY COMMUNICATION BUS INTERCONNECTING A TELEVISION CONTROLLER AND AN INTERNET MODULE

(76) Inventors: Kevin J. Gaughan, 1933 Coldspring, Arlington Heights, IL (US) 60004; Thomas J. Zato, 1750 Banbury Rd., Inverness, IL (US) 60067

( * ) Notice: Subject to any disclaimer, the term of this patent is extended or adjusted under 35 U.S.C. 154(b) by 0 days.

This patent is subject to a terminal disclaimer.

(21) Appl. No.: 12/505,889

(22) Filed: Jul. 20, 2009

(65) Prior Publication Data
US 2009/0313671 A1 Dec. 17, 2009

Related U.S. Application Data

(60) Continuation of application No. 12/259,411, filed on Oct. 28, 2008, which is a division of application No. 10/420,131, filed on Apr. 22, 2003, which is a division of application No. 09/551,410, filed on Apr. 18, 2000, now Pat. No. 6,785,906, which is a continuation of application No. 08/787,831, filed on Jan. 23, 1997, now Pat. No. 6,097,383.

(51) Int. Cl.
*H04N 7/173* (2006.01)
*H04N 7/16* (2006.01)
*H04N 5/445* (2006.01)
*H04N 11/00* (2006.01)
*H04N 5/45* (2006.01)

(52) U.S. Cl. .............. 725/110; 348/552; 348/565; 725/37; 725/109; 725/131; 725/139; 725/151

(58) Field of Classification Search .............. 725/109
See application file for complete search history.

(56) References Cited

U.S. PATENT DOCUMENTS 4,568,909 A 2/1986 Whynacht (Continued)

FOREIGN PATENT DOCUMENTS

EP 07 10017 5/1996

(Continued)

OTHER PUBLICATIONS

Mitsubishi Takes Motorola MPC801 for Diamondweb TV Computergram International, Aug. 29, 1996.

(Continued)

*Primary Examiner*—Joseph P Hirl
*Assistant Examiner*—Jun Fei Zhong
(74) *Attorney, Agent, or Firm*—Schiff Hardin LLP

(57) ABSTRACT

A web television includes a display, a tuner, an internet module, and a PIP module. The tuner is arranged to select television video for display on the display and to select television audio for display by a speaker of the web television. The internet module is arranged to supply internet video for display on the display and to supply internet audio for display by the speaker of the web television, and the internet video and audio are derived from internet communications between the web television and internet content providers. The PIP module is arranged to provide a PIP area within a main area of the display. The internet video and the television video may be swapped between the PIP area and the main area of the display, and the speaker of the web television may be swapped between the internet audio and the television audio.

4 Claims, 4 Drawing Sheets

U.S. PATENT DOCUMENTS

| | | | |
|---|---|---|---|
| 4,746,983 A | 5/1988 | Hakamada | |
| 4,903,129 A | 2/1990 | Bell et al. | |
| 5,192,854 A | 3/1993 | Counts | |
| 5,268,928 A | 12/1993 | Herh et al. | |
| 5,371,573 A | 12/1994 | Kagaya et al. | |
| 5,380,991 A | 1/1995 | Valencia et al. | |
| 5,432,561 A | 7/1995 | Strubbe | |
| 5,453,796 A | 9/1995 | Duffield et al. | |
| 5,519,780 A | 5/1996 | Woo et al. | |
| 5,594,509 A | 1/1997 | Florin et al. | |
| 5,604,542 A | 2/1997 | Dedrick | |
| 5,638,113 A | 6/1997 | Lappington et al. | |
| 5,650,831 A | 7/1997 | Farwell | |
| 5,665,953 A | 9/1997 | Mazzamulo et al. | |
| 5,699,104 A | 12/1997 | Yoshinobu | |
| 5,710,605 A | 1/1998 | Nelson | |
| 5,734,413 A | 3/1998 | Lappington et al. | |
| 5,754,864 A | 5/1998 | Hill | |
| 5,761,606 A | 6/1998 | Wolzien | |
| 5,767,897 A | 6/1998 | Howell | |
| 5,774,664 A | 6/1998 | Hidary et al. | |
| 5,774,666 A | 6/1998 | Portuesi | |
| 5,778,181 A | 7/1998 | Hidary et al. | |
| 5,784,095 A | 7/1998 | Robbins et al. | |
| 5,801,753 A | 9/1998 | Eyer et al. | |
| 5,818,441 A | 10/1998 | Throckmorton et al. | |
| 5,844,552 A | 12/1998 | Gaughan et al. | |
| 5,872,588 A * | 2/1999 | Aras et al. | 725/14 |
| 5,880,769 A | 3/1999 | Nemirofsky et al. | |
| 5,889,506 A | 3/1999 | Lopresli et al. | |
| 5,892,536 A | 4/1999 | Logan et al. | |
| 5,905,476 A | 5/1999 | McLaughlin et al. | |
| 5,907,322 A | 5/1999 | Kelly et al. | |
| 5,923,379 A * | 7/1999 | Patterson | 725/70 |
| 5,929,849 A * | 7/1999 | Kikinis | 725/113 |
| 5,940,073 A | 8/1999 | Klostermann et al. | |
| 5,940,074 A * | 8/1999 | Britt et al. | 715/749 |
| 5,946,047 A | 8/1999 | Levan | |
| 5,977,963 A | 11/1999 | Gaughan et al. | |
| 6,002,394 A * | 12/1999 | Schein et al. | 725/39 |
| 6,002,450 A | 12/1999 | Darbee et al. | |
| 6,008,836 A | 12/1999 | Bruck et al. | |
| 6,018,768 A | 1/2000 | Ullman et al. | |
| 6,031,867 A | 2/2000 | Johnson et al. | |
| 6,040,829 A | 3/2000 | Croy et al. | |
| 6,073,171 A | 6/2000 | Gaughan et al. | |
| 6,097,383 A | 8/2000 | Gaughan et al. | |
| 6,097,441 A | 8/2000 | Allport | |
| 6,104,334 A | 8/2000 | Allport | |
| 6,130,726 A | 10/2000 | Darbee et al. | |
| 6,137,839 A | 10/2000 | Mannering et al. | |
| 6,175,831 B1 | 1/2001 | Weinreich et al. | |
| 6,177,931 B1 | 1/2001 | Alexander et al. | |
| 6,181,326 B1 | 1/2001 | Takahashi | |
| 6,182,287 B1 | 1/2001 | Schneidewend et al. | |
| 6,219,839 B1 | 4/2001 | Sampsell | |
| 6,272,680 B1 | 8/2001 | Gaughan et al. | |
| 6,278,499 B1 | 8/2001 | Darbee et al. | |
| 6,282,713 B1 | 8/2001 | Kitsukawa et al. | |
| 6,313,887 B1 | 11/2001 | Gudorf | |
| 6,349,410 B1 | 2/2002 | Lortz | |
| 6,374,245 B1 | 4/2002 | Park | |
| 6,397,387 B1 | 5/2002 | Rosin et al. | |
| 6,401,059 B1 | 6/2002 | Shen et al. | |
| 6,437,836 B1 | 8/2002 | Huang et al. | |
| 6,732,369 B1 | 5/2004 | Schein et al. | |
| 6,785,906 B1 | 8/2004 | Gaughan et al. | |
| 6,792,616 B1 | 9/2004 | Jerding et al. | |
| 6,802,076 B1 | 10/2004 | Terakado et al. | |
| 6,925,444 B1 | 8/2005 | McCollom et al. | |
| 6,978,471 B1 | 12/2005 | Klopfenstein | |
| 7,028,330 B1 | 4/2006 | Gaughan et al. | |
| 7,340,763 B1 | 3/2008 | Harris | |
| 7,372,915 B1 | 5/2008 | Sako et al. | |
| 2001/0003099 A1 | 6/2001 | Von Kohorn | |
| 2005/0111823 A1 | 5/2005 | Dureau | |
| 2007/0067805 A1 | 3/2007 | Macrae et al. | |
| 2009/0091657 A1 | 4/2009 | Gaughan et al. | |
| 2009/0100485 A1 | 4/2009 | Gaughan et al. | |

FOREIGN PATENT DOCUMENTS

| | | |
|---|---|---|
| WO | WO 96/37996 | 11/1996 |
| WO | WO 98/47286 | 10/1998 |
| WO | WO 98/57497 | 12/1998 |
| WO | WO 99/13644 | 3/1999 |

OTHER PUBLICATIONS

Comdex—Mitsubishi Previews 40-inch DiamondWeb TV Nov. 19, 1996, Newsbytes.

Mitsubishi joins Internet TV market Screen Digest, Dec. 1, 1996.

Internet Web page fro Sony "Now Everyone can experience the Internet" 1996.

* cited by examiner

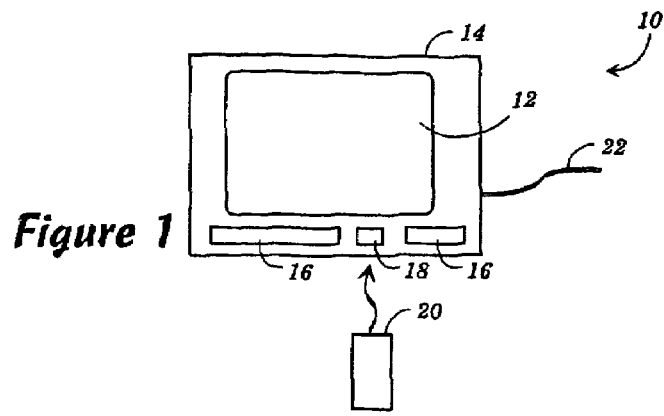
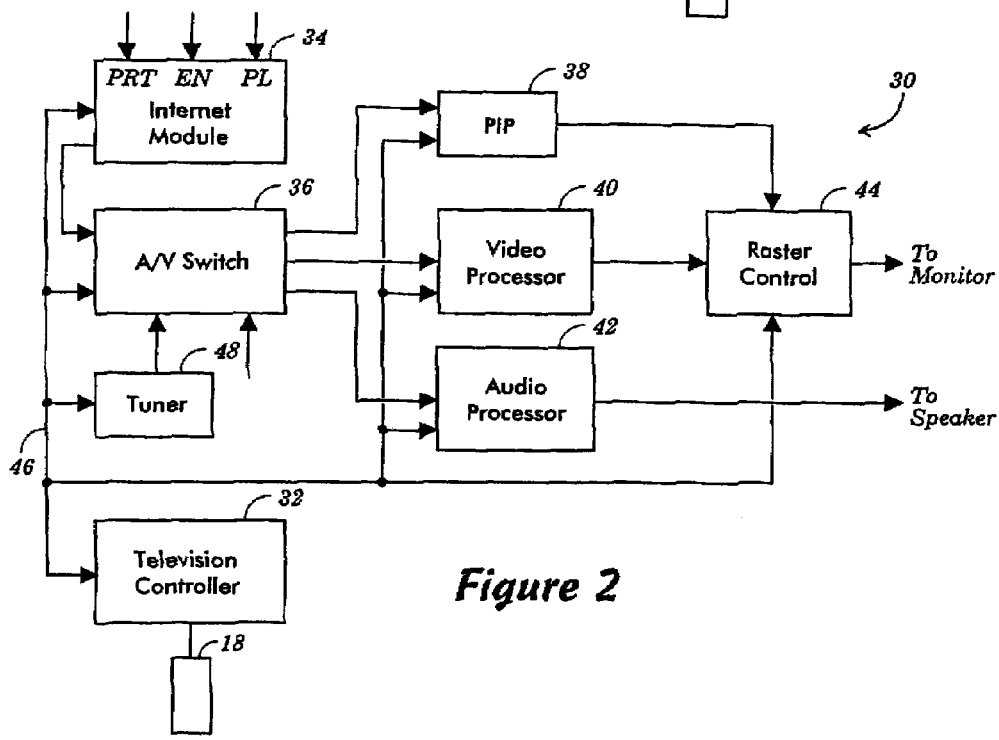

| TV | Start | Slave Address $44 | Command $01 | IR Data Page $09 | IR Data Byte | Stop |
|----|-------|-------------------|-------------|------------------|--------------|------|
| IM |       |                   | ACK         | ACK              | ACK          | ACK  |

*Figure 4* (70)

| TV | Start | Slave Address $44 | Command $01 | IR Trakball X-Y Position Page $14 | X Position | Y Position | Stop |
|----|-------|-------------------|-------------|-----------------------------------|------------|------------|------|
| IM |       |                   | ACK         | ACK                               | ACK        | ACK        | ACK  |

*Figure 5* (80)

| TV | Start | Slave Address $44 | Command $01 | IR Keyboard Page $15 | Last IR Key | Current IR Key | Stop |
|----|-------|-------------------|-------------|----------------------|-------------|----------------|------|
| IM |       |                   | ACK         | ACK                  | ACK         | ACK            | ACK  |

*Figure 6* (90)

| TV | Start | Slave Address $44 | Command $03 | Software Revision # | Software Version # | Stop |
|----|-------|-------------------|-------------|---------------------|--------------------|------|
| IM |       |                   | ACK         | ACK                 | ACK                | ACK  |

*Figure 7* (100)

| TV | Start | Slave Address $45 |     | ACK       | ACK       | ACK         | ACK       | HIG   | Stop |
|----|-------|-------------------|-----|-----------|-----------|-------------|-----------|-------|------|
| IM |       |                   | ACK | Status $00| Mode Byte | Status Byte | Request Byte | Check-sum |      |

*Figure 8* (110)

| TV | Start | Slave Address $45 |     | ACK            | ACK               | ACK              | HIG       | Stop |
|----|-------|-------------------|-----|----------------|-------------------|------------------|-----------|------|
| IM |       |                   | ACK | Version ID $03 | Software Revision #| Software Version #| Check-sum|      |

*Figure 9* (120)

WEB TELEVISION HAVING A TWO-WAY COMMUNICATION BUS INTERCONNECTING A TELEVISION CONTROLLER AND AN INTERNET MODULE

RELATED APPLICATIONS

The present invention is a continuation of copending U.S. patent application Ser. No. 12/259,411 filed on Oct. 28, 2008, which is a divisional of a copending U.S. patent application Ser. No. 10/420,131 filed on Apr. 22, 2003, which is a divisional of U.S. patent application Ser. No. 09/551,410 filed on Apr. 18, 2000 now U.S. Pat. No. 6,785,906 which is a continuation of a U.S. patent application Ser. No. 08/787,831 was filed on Jan. 23, 1997 (now U.S. Pat. No. 6,097,383). The present application is related to the inventions disclosed in U.S. patent application Ser. No. 08/787,660 filed on Jan. 23, 1997 (now U.S. Pat. No. 6,073,171), and in U.S. patent application Ser. No. 08/787,654 filed on Jan. 23, 1997 (now U.S. Pat. No. 5,977,963), and in U.S. patent application Ser. No. 08/787,662 filed on Jan. 23, 1997 (now U.S. Pat. No. 5,844,552), and in U.S. patent application Ser. No. 09/551,114 filed on Apr. 18, 2000 (now U.S. Pat. No. 6,272,680).

TECHNICAL FIELD OF THE INVENTION

The present invention relates to a web TV having a television controller, an Internet module, and a two-way communication bus to support communication between the television controller and the internet module.

BACKGROUND OF THE INVENTION

The internet has become an integral part in the way in which content is delivered to end users. For example, newspapers, magazines, and television and cable networks have web sites that are increasingly being used to deliver content. Content is delivered by on-line content providers which include, for example, web sites and on-line service providers such as AOL™.

Content is accessed by end users via on-line access devices. The on-line access device most often used currently is the personal computer. However, non-personal-computer on-line access devices are being, and have been, developed that enable end users to connect to the internet. For example, one type of non-personal-computer on-line access device is a web television.

A web television generally includes many of the components of a conventional television, such as a television controller, a video processor, an audio processor, and the like. However, unlike a conventional television, a web television also includes an internet module, which permits the web television to be used as an on-line access device, and an input device, which permits the user to interface with the internet module and the web television in order to communicate over the internet by way of the web television. Accordingly, a web television may be used in a manner similar to a personal computer in order to gain access to on-line content providers.

The television controller of a web television currently responds to inputs from the end user in order to control the web television in either a normal television mode or an internet mode. During the television mode, the television controller responds to instructions from the end user, usually by way of a remote control, in order to select and present television signals by way of the television's display and speakers. During the internet mode, the television controller transmits messages to the internet module permitting the internet module to be used in order to communicate over the internet.

However, the television controllers of existing web televisions do not receive messages from their corresponding internet modules. Accordingly, the television controllers cannot determine the status of their corresponding internet modules, the software version numbers and revision numbers of the software being executed by their corresponding internet module, and other characteristics of the internet module which would be useful to the television controller. Also, current web televisions do not have integrated PIP functions (i.e., PIP functions that are internal to the web television and that do not require a set top internet box) which permit internet video from the internet module to be displayed in the PIP and which permit internet video from the internet module in the PIP to be swapped with television video from the television tuner of the web television. Moreover, current web televisions do not permit internet audio from the internet module to be swapped with television audio from the television tuner of the web television from a single integrated control source such as a television controller.

The present invention solves one or more of the above noted problems.

SUMMARY OF THE INVENTION

In accordance with one aspect of the invention, a web television comprises a display, a tuner, an internet module, a television controller, a communication bus, a PIP module, and a switching means. The tuner is arranged to select television video for display on the display. The internet module is arranged to supply internet video for display on the display, and the internet video is derived from internet communications between the web television and internet content providers. The television controller is arranged to control the display. The communication bus is arranged to interconnect the internet module and the television controller in order to support two-way communication between the internet module and the television controller, and one or more communications that are generated by the television controller for transmission via the communication bus comprise mode information indicating in which of a set of one or more modes that the web television is operating. The PIP module is arranged to provide a PIP area of the display. The switching means switches the PIP area between the internet video and the television video.

In accordance with another aspect of the invention, a method of displaying video in a web television comprises the following: transmitting a first control signal to a tuner to select television video for display on a display; transmitting a second control signal to an internet module to provide internet video for display on the display, wherein the internet video is derived from internet communications between the web television and internet content providers; transmitting mode information to the internet module via a two-way communication bus, the mode information indicating one or more modes that the web television is operating; displaying at least one of the television video and internet video on the display; providing a PIP area of the display; and, switching the PIP area between the internet video and the television video.

In accordance with still another aspect of the invention, a web television comprises a display, a tuner, an internet module, a television controller arranged to control the display, and a communication bus. The tuner is arranged to select television video for display on the display. The internet module is arranged to supply internet video for display on the display, and the internet video is derived from internet communications between the web television and internet content providers. The television controller is arranged to control the display. The communication bus is arranged to interconnect the internet module and the television controller in order to support two-way communication between the internet module and the television controller, one or more communications that are generated by the television controller for transmission via the communication bus comprise mode information indicating in which of a set of one or more modes that the web television is operating, and the mode information comprises information indicating whether a PIP mode is on or off.

In accordance with yet another aspect of the invention, a method of displaying video in a web television comprises the following: transmitting a first control signal to a tuner to select television video for display on a display; transmitting a second control signal to an internet module to provide internet video for display on the display, wherein the internet video is derived from internet communications between the web television and internet content providers; transmitting mode information to the internet module via a two-way communication bus, the mode information indicating one or more modes that the web television is operating; and, displaying at least one of the television video and internet video on the display, wherein the mode information comprises information indicating whether a PIP mode is on or off.

BRIEF DESCRIPTION OF THE DRAWINGS

These and other features and advantages of the present invention will become more apparent from a detailed consideration of the invention when taken in conjunction with the drawings in which:

FIG. 1 illustrates a web television arranged in accordance with the present invention;

FIG. 2 illustrates a communication system having an internet module and a television controller for controlling the web television of FIG. 1;

FIG. 3 illustrates a message format of a status command message written by the television controller to the internet module of FIG. 2;

FIG. 4 illustrates a message format of a data page command message written by the television controller to the internet module of FIG. 2;

FIG. 5 illustrates a message format of a trakball position command message written by the television controller to the internet module of FIG. 2;

FIG. 6 illustrates a message format of a keyboard page command message written by the television controller to the internet module of FIG. 2;

FIG. 7 illustrates a message format of a controller version command message written by the television controller to the internet module of FIG. 2;

FIG. 8 illustrates a message format of a status response message read by the television controller from the internet module of FIG. 2;

FIG. 9 illustrates a message format of an internet module response message read by the television controller from the internet module of FIG. 2;

DETAILED DESCRIPTION

Figure 10:
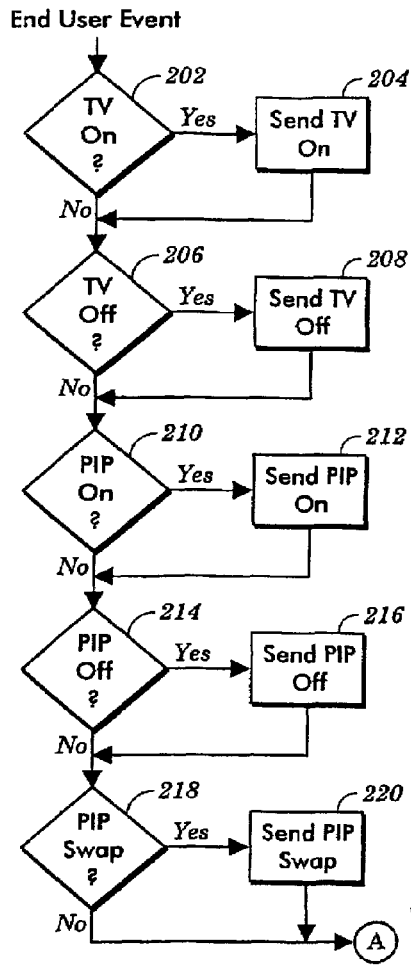
FIGS. 10-13 illustrate a program which is executed by the television controller in writing messages to, and reading messages from, the internet module of FIG. 1; and, FIG. 14 illustrates an alternative embodiment of a communication system having an integrated television/internet controller for controlling the web television of FIG. 1.
Figure 11:
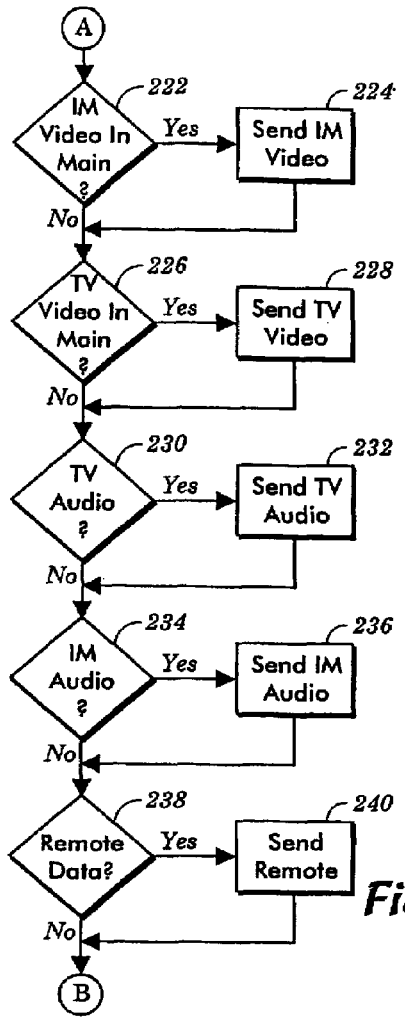
Figure 12:
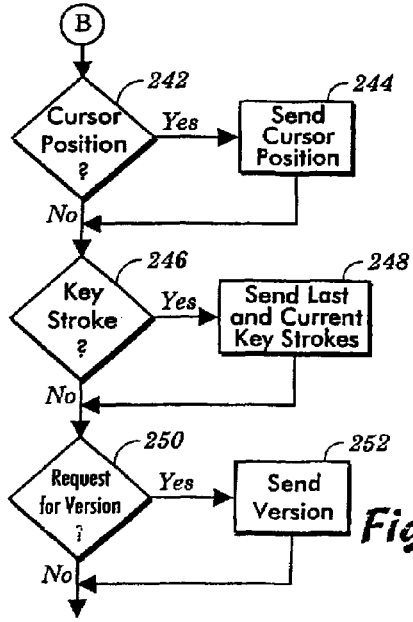
Figure 13:
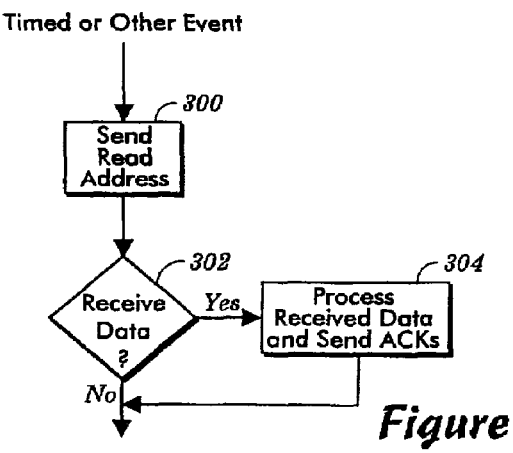

A web television 10 is illustrated in FIG. 1 and includes a display 12 (such as a CRT) housed in a cabinet 14. The cabinet 14 also houses various switches 16 as well as an infrared sensor 18 that responds to an infrared remote control device 20. Alternatively, the remote control device 20 may be hardwired to the web television 10, or the remote control device 20 may transmit wireless signals of a kind other than infrared. The remote control device 20 may be a trakball type remote control, a conventional remote control, a keyboard type remote control, or the like.

A communication medium 22 is connected to the web television 10 permitting the web television 10 to communicate with on-line content providers such as by way of the internet. The communication medium 22 may be a phone line, a cable, an integrated services digital network, a digital subscriber line (which may include an asymmetrical digital subscriber line, a rate adapted digital subscriber line, or the like), a satellite link, or any other type of medium which supports communication between the web television 10 and on-line content providers.

A television control system 30 for controlling the operations of the web television 10 is illustrated in FIG. 2. The television control system 30 includes a television controller 32, an internet module 34, an audio/video switch 36, a PIP module 38, a video processor 40, an audio processor 42, a raster control 44, a communication bus 46, and a tuner 48. The internet module 34 may be any of the suitable commercially available devices that permit communication between a television and on-line content providers. The internet module 34 has an Ethernet port EN and a phone line port PL for connecting the internet module 34 to the communication medium 22 so that the internet module 34 may transmit and receive information to and from remote on-line devices. The internet module 34 also has a port PRT for connecting the internet module 34 to a printer so that internet communications may be printed.

The television controller 32 may be a microprocessor with corresponding memory and communication circuits for supporting communications over the communication bus 46 between the television controller 32, the internet module 34, the audio/video switch 36, the PIP module 38, the video processor 40, the audio processor 42, the raster control 44, and the tuner 48. The communication circuit of the television controller 32 includes a transmitter and a receiver. The communication bus 46 may be an IIC communication bus having serial control, data, and address lines.

The audio/video switch 36 is controlled by the television controller 32 in order to supply internet communications, which are supported by the internet module 34, and/or television signals, which are tuned by the tuner 48, to the PIP module 38, to the video processor 40, and to the audio processor 42. The PIP module 38, the video processor 40, the audio processor 42, and the raster control 44 are controlled by the television controller 32 in order to appropriately supply the internet communications and television signals to the display 12 and the speakers of the web television 10.

Accordingly, the television controller 32, in response to appropriate signals from the remote control device 20, may control the audio/video switch 36, the PIP module 38, the video processor 40, the audio processor 42, and the raster control 44 so that (i) internet video is displayed on the display 12 and audio supported by the internet module 34 is provided to the speakers of the web television 10, (ii) television video is displayed on the display 12 and audio selected by the tuner 48 is provided to the speakers of the web television 10, (iii) internet video supported by the internet module 34 is displayed on the display 12 and television audio selected by the tuner 48 is provided to the speakers of the web television 10, (iv) internet audio supported by the internet module 34 is provided to the speakers and television video selected by the tuner 48 is displayed on the display 12 of the web television 10, (v) internet video supported by the internet module 34 is displayed in a PIP area in the display 12, television video selected by the tuner 48 is displayed in the main area in the display 12, and either internet audio or television audio is provided to the speakers of the web television 10, and/or (vi) television video selected by the tuner 48 is displayed in a PIP area of the display 12, internet video supported by the internet module 34 is displayed in the main area of the display 12, and either internet audio or television audio is provided to the speakers of the web television 10. The television controller 32, in response to appropriate signals from the remote control device 20, may also control the audio/video switch 36, the PIP module 38, the video processor 40, the audio processor 42, and the raster control 44 to swap internet video and television video between the PIP area and the main area, and to swap the speaker of the web television 10 between internet audio and television audio.

Alternatively, a swapping function may be initiated by the internet module 34. For example, when the web television 10 is in internet mode so that an internet screen is displayed on the display 12, a button on the internet screen may be selected by the user through use of the remote control device 20 causing the internet module 34 to send a request for a PIP swap to the television controller 32. In response, the television controller 32 suitably controls the audio/video switch 36, the PIP module 38, the video processor 40, the audio processor 42, and the raster control 44 to swap internet video and television video between the PIP area and the main area, and/or to swap the speaker of the web television 10 between internet audio and television audio. As another example, when the web television 10 is in internet mode, the internet module 34 may determine that the reception of an internet communication is taking too long and, until reception is complete, is appropriating the main television unnecessarily. Accordingly, the internet module 34 may send a request for a PIP swap to the television controller 32 causing the television controller 32 to swap internet video to the PIP area and television video to the main area, and/or to swap the speaker of the web television 10 from internet audio to television audio, so that the user need not be bothered with the internet communication until its reception is complete.

The communication bus 46 supports two-way communication between the internet module 34 and the television controller 32. Examples of messages which may be used during such communication are shown in FIGS. 3-9 as messages 60, 70, 80, 90, 100, 110, and 120. During communication between the television controller 32 and the internet module 34, the television controller 32 operates as a master station by controlling communication between the television controller 32 and the internet module 34 over the communication bus 46.

Accordingly, as shown by each of the messages 60, 70, 80, 90, 100, 110, and 120, the television controller 32 initiates each communication between itself and the internet module 34 by transmitting a start signal, which may be a bit or bit sequence and which designates the start of the messages 60, 70, 80, 90, 100, 110, and 120, followed by an appropriate slave address. The slave address (i) specifies the address of a module (such as the internet module 34), and (ii) designates whether the television controller 32 is writing to the communication bus 46 (i.e., transmitting) or reading from the communication bus 46 (i.e., receiving).

As shown by each of the messages 60, 70, 80, 90, and 100 of FIGS. 3-7, a write slave address having a particular value, such as $44, is transmitted by the television controller 32 when the television controller 32 writes a message to the communication bus 46 and the message is intended for the internet module 34. As shown by each of the messages 110 and 120 of FIGS. 8 and 9, a read slave address having a particular value, such as $45, is transmitted by the television controller 32 when the television controller 32 determines to read information on the communication bus 46 from the internet module 34. After the television controller 32 transmits the start signal followed by the slave address, the television controller 32 waits for an acknowledgement (ACK) from the internet module 34.

The message 60 illustrated in FIG. 3 is transmitted to the internet module 34 whenever the television controller 32 has status information to transmit, such as in the event that (i) a change occurs which affects a mode bit in the message 60 (these mode bits are described below), (ii) the television controller 32 receives a request from the internet module 34, in which case the message 60 is transmitted by the television controller 32 as an acknowledgement of the request, (iii) the internet module 34 fails to respond to a poll from the television controller 32 for a predetermined amount of time, (iv) the television controller 32 receives a command from the user which switches the television controller 32 in or out of internet mode, or the like.

Upon receipt of an acknowledgement (ACK) from the internet module 34, the television controller 32 transmits a status command byte (which may have a value of $00, for example) to indicate that the message 60 is a status message containing certain status information. This status information indicates to the internet module 34 the status of certain modes of the web television 10. The television contoller 32 then waits to receive from the internet module 34 an acknowledgement of the command byte. Upon receiving this acknowledgement, the television controller 32 transmits a mode byte.

The mode byte, for example, may be eight bits in length and may be used for a variety of purposes. The mode byte may have (i) a first bit which indicates whether the web television 10 is off or on, (ii) a second bit which indicates a television receiver configuration or model, (iii) a third bit which indicates whether the main area of the display 12 is to contain internet video received by the internet module 34 or television video of a television signal selected by the tuner 48, (iv) a fourth bit which indicates whether the speakers of the web television 10 are supplied with internet audio received by the internet module 34 or television audio of a television signal selected by the tuner 48, (v) a fifth bit which indicates whether the PIP module 38 is on or off, (vi) a sixth bit which indicates whether a screen saver mode is on or off, and (vii) two bits for the like purposes.

The information contained in these mode bits may indicate the results of commands from the end user by way of the television controller 32 or from the internet module 34. For example, if the end user desires to place internet video in the main area of the display 12 and to place television video in the PIP area of the display 12, the end user will do so by use of the remote control device 20 which causes the television controller 32 to send commands in order to control the audio/video switch 36, the PIP module 38, the video processor 40, the audio processor 42, the raster control 44, and/or the tuner 48, as appropriate. The results of these control actions affect the mode bits, causing the television controller 32 to send the message 60 to the internet module 34. As another example, the internet module 34 may transmit a request to the television controller 32 that internet video be placed in the main area of the display 12 and that television video be placed in the PIP area of the display 12. Such a request may result from a selection by the end user of an appropriate button in an internet screen supplied to the display 12 by the internet module 34. As a result of the request, the television controller 32 sends commands to control the audio/video switch 36, the PIP module 38, the video processor 40, the audio processor 42, the raster control 44, and/or the tuner 48, as appropriate. This action also affects the mode bits, causing the television controller 32 to send the message 60 to the internet module 34 as an acknowledgement of the request transmitted by the internet module 34 to the television controller 32.

Following transmission of the mode byte, the television controller 32 waits for an acknowledgement from the internet module 34. Upon receipt of the acknowledgement, the television controller 32 transmits a request byte which, for example, may be used to request the internet module 34 (i) to transmit back its version ID (which may be useful for diagnostic purposes), (ii) to reset the internet module 34 (such as when the web television 10 is turned off by the end user, when the internet module 34 fails to acknowledge the communication bus 46 for more than a predefined limit of time, or when the internet module 34 otherwise requires reset), or the like. A request that the internet module 34 reset itself causes the internet module 34 to transmit back a status message indicating compliance.

After transmittal of the request byte, the television controller 32 waits for an acknowledgement. Upon receipt of the acknowledgement, the television controller 32 transmits a stop signal (such as a bit or bit sequence) designating the end of the message 60.

The messages 70, 80, and 90 are illustrated in FIGS. 4, 5, and 6. The messages 70, 80, and 90 are similar to the message 60 of FIG. 3 in that the messages 70, 80, and 90 are initiated with a start signal followed by the write slave address indicating that information is to be transmitted by the television controller 32 to the internet module 34. Upon receipt of an acknowledgement from the internet module 34, the television controller 32 transmits a remote control command byte (which may have a value of $01, for example) to indicate that the messages 70, 80, and 90 contain remote control information which has been transmitted by the remote control device 20 to the television controller 32 and which may be useful to the internet module 34. After acknowledgement of this remote control command byte, the television controller 32 next transmits a remote control page byte which indicates that certain remote control page information follows.

For example, as shown in FIG. 4, the remote control page byte of the message 70 is a data page byte (containing a value of $09, for example) to indicate that the message 70 includes a data byte. After transmitting the remote control data page byte, the television controller 32 waits for an acknowledgement. Upon receipt of the acknowledgement, the television controller 32 transmits the data byte. The data byte may be used to transmit trakball push (click) data in the case where the remote control device 20 has a trakball and the trakball has been pushed, enter key push (click) data in the case where the remote control device 20 has an enter key and the enter key has been pushed, and the like. After transmittal of the data byte, the television controller 32 waits for an acknowledgement from the internet module 34. Upon receipt of the acknowledgement, the television controller 32 transmits a stop signal designating the end of the message 70.

The message 80, which is shown in FIG. 5, is transmitted by the television controller 32 in order to convey displacement information to the internet module 34. For example, the displacement information transmitted in the message 80 may include the x and y position of a cursor or highlighting or the like, as selected by movement of a trakball on a trakball type remote control. As another example, the displacement information transmitted in the message 80 may include the x and y position of a cursor or highlighting or the like, as selected by arrow keys on either a conventional remote control, a keyboard remote control, or a trakball remote control.

The message 80 includes the start signal, the write slave address, the remote control command byte, and the remote control page byte described above. However, unlike the remote control page byte of the message 70, the remote control page byte of the message 80 is an X-Y position page byte (containing a value of $14, for example) to indicate that displacement information is contained in the message 80. Accordingly, as indicated in FIG. 5, upon receipt of an acknowledgement following transmission of the remote control page byte, the television controller 32 transmits X and Y position bytes. The X position byte designates a current X position of a cursor, highlighting, or the like, as selected by a trakball, by arrow keys, or the like. The Y position byte similarly designates a current Y position of a cursor, highlighting, or the like, as selected by a trakball, by arrow keys, or the like. Upon receipt of an acknowledgement after transmission of each of the X and Y position bytes, the television controller 32 transmits a stop signal designating the end of the message 80.

The message 90, which is shown in FIG. 6, is transmitted by the television controller 32 in order to convey alpha and/or numeric character data or the like to the internet module 34. For example, when the web television 10 is in internet mode and the remote control device 20 transmits characters (such as alpha and/or numeric characters) to the web television 10, the television controller 32 responds by transmitting the characters to the internet module 34 by way of the message 90. The message 90 includes the start signal, the write slave address, the remote control command byte, and the remote control page byte described above. However, unlike the remote control page bytes of the messages 70 and 80, the remote control page byte of the message 90 is a keyboard page byte (containing a value of $15, for example) to indicate that character data is contained in the message 90. Accordingly, as indicated in FIG. 6, upon receipt of an acknowledgement following transmission of the remote control page byte, the television controller 32 transmits the last keystroke followed by the current keystroke. Following suitable acknowledgements, the television controller 32 transmits a stop signal designating the end of the message 90.

The television controller 32 transmits a message 100 as illustrated in FIG. 7 in order to convey to the internet module 34 the revision and version numbers of the television controller 32. The message 100 includes the start signal and the write slave address described above. Following acknowledgement of the write slave address byte by the internet module 34, the television controller 32 transmits a version command byte in the message 100, The version command byte of the message 100 (containing a value of $04, for example) indicates that the message 100 contains the revision and version numbers of the television controller 32. The revision and version numbers of the television controller 32 may be useful to the internet module 34 in determining which of its features are compatible with the software executed by the television controller 32 and, therefore, should be initialized.

As indicated above, when the television controller 32 is ready to read information which it previously requested from the internet module 34, or when the television controller 32 is ready to poll the internet module 34, it transmits a read slave address over the communication bus 46. Accordingly, as shown in FIGS. 8 and 9, this read slave address may have a value of $45, for example. The internet module 34 will then return the previously requested information and/or its status in a message format such as that shown in FIGS. 8 and 9.

The message 110 shown in FIG. 8 includes a start signal, as described above, and a read slave address, both of which are transmitted by the television controller 32. Generally, a read slave address, which does not follow a previous request by the television controller 32 for specific information from the internet module 34 (such as version and revision numbers), indicates that the television controller 32 is polling the internet module 34. Following transmission of the start signal and the read slave address, the television controller 32 waits for an acknowledgement from the internet module 34 and an additional byte which, for example, may have a status indicating byte as shown in FIG. 8 or a version indicating byte as shown in FIG. 9.

In the message 110, a status indicating byte (containing a value of $00, for example) indicates that mode and status information bytes follow. The mode byte in the message 110 may be used to indicate certain information such as (i) whether the internet module 34 is active and has been initialized, (ii) whether the internet module 34 is connected to a phone line or whether the internet module is offline, (iii) whether the internet module 34 is connected to the Ethernet, and (iv) other possible information such as whether the internet module 34 is executing Web Browser, Email, User Setup, or other applications. Following receipt of the status indicating and mode bytes, the television controller 32 transmits corresponding acknowledgements and then waits for a status byte.

The status byte received by the television controller 32 may indicate whether internet audio or television audio is being supplied to the speaker of the web television 10, whether a Screen Saver mode of the internet module 34 is on or off, and the like. Following receipt of the status byte, the television controller 32 transmits an acknowledgement and waits for a request byte.

The request byte from the internet module 34 may request the television controller 32 to perform one or more of the following functions: (i) transmit its version ID; (ii) execute a PIP swap function; (iii) execute a PIP off function; (iv) execute a PIP on function; (v) switch the video output of the internet module 34 into the main area of the display 12; (vi) switch the video output of the tuner 48 into the main area of the display 12; and the like.

Many of these requests result when the user, by use of the remote control device 20 for example, clicks on an appropriate button of an internet screen which the internet module 34 causes to appear on the display 12 of the web television 10. The click information is transmitted by the television controller 32 in the messages 70, 80, and 90, as appropriate, and the selected buttons are then transmitted by the internet module 34 to the television controller 32 as requests so that the television controller 32 can take appropriate action with respect to the audio/video switch 36, the PIP module 38, the video processor 40, the audio processor 42, and the raster control 44. Additionally, the television controller 32 transmits the message 100 to the internet module 34 in response to function (i) above, and the television controller 32 transmits the message 60 to the internet module 34 in response to functions (ii), (iii), (iv), (v), (vi), and the like.

Following receipt of the request byte, the television controller 32 transmits an acknowledgement and waits for a checksum byte. All messages which are sent from the internet module 34 to the television controller 32 over the communication bus 46 may use a checksum at the end of the message for detection of transmission errors. This checksum may be the two's complement of the sum of all bytes transmitted in the message, not including the device address. In this way, the sum of all bytes following the device address will be zero. If this checksum is not zero, the message will not be processed by the television controller 32 and the television controller 32 will require a retransmission of the message from the internet module 34. Following receipt of the checksum byte, the television controller 32 transmits a HIGH line level followed by a stop signal.

The message 120 as illustrated in FIG. 9 is transmitted so that the internet module 34 may respond to the message 60 having its request byte set to request version and revision numbers from the internet module 34. The message 120 includes the start signal and the read slave address of the message 110. Following transmission of the start signal and the read slave address, the television controller 32 waits for an acknowledgement followed by a byte having a value indicating that version identification information from the internet module 34 follows. For example, this byte may have a value of $03. Following receipt of this version identification indicating byte, the television controller 32 transmits, to the internet module 34, an acknowledgement that it has received the version identification indicating byte.

Upon receipt of this acknowledgement, the internet module 34 transmits a software revision number byte. Following receipt of the software revision number byte, the television controller 32 transmits an acknowledgement and then waits for a software version byte.

Upon receipt of this acknowledgement, the internet module 34 transmits the software version number byte. Following receipt of the software version number byte, the television controller 32 transmits an acknowledgement and then waits for a checksum byte.

Following receipt of the checksum byte, the tele) vision controller 32 transmits a HIGH line level and a stop signal.

FIGS. 10-13 illustrate an example of a program 200 which may be executed by the television controller 32 in order to facilitate the transmission and reception of the messages 60-120 over the communication bus 46. The program 200, for the most part, is an event-initiated program. In general terms, the events are either user-selected events (for example, events selected by the user through use of the remote control device 20) or polling events. In the case of user-selected events, a block 202 determines whether the event is an user instruction to turn on the web television 10. If so, a block 204 transmits messages to the tuner 48, the audio/video switch 36, the video processor 40, and the audio processor 42 to begin displaying video and audio on the web television 10. The block 204 also transmits, to the internet module 34, the message 60 with the first bit of the message 60 set to indicate that the web television 10 is on.

A block 206 determines whether the event is an user instruction to turn off the web television 10. If so, a block 208 transmits messages to the audio/video switch 36, the video processor 40, the audio processor 42, and the tuner 48 to turn off the web television 10. The block 208 also transmits, to the internet module 34, the message 60 with the first bit of the message 60 set to indicate that the web television 10 is off.

A block 210 determines whether the event is an user instruction or an internet module 34 request to turn on the PIP area. If so, a block 212 transmits a message to the PIP module 38 in order to initiate PIP operation. The block 212 also transmits, to the internet module 34, the message 60 with the fifth bit of the message 60 set to indicate that PIP operation has been initiated.

A block 214 determines whether the event is an user instruction or an internet module 34 request to turn off the PIP area. If so, a block 216 transmits a message to the PIP module 38 in order to conclude PIP operation. The block 216 also transmits, to the internet module 34, the message 60 with the fifth bit of the message 60 set to indicate that PIP operation has been concluded.

A block 218 determines whether the event is an user instruction or an internet module 34 request to perform a PIP swap. If so, a block 220 transmits a message to the audio/video switch 36 in order to swap video between the PIP display and the main area of the display 12. The block 220 also transmits, to the internet module 34, the message 60 with the third bit of the message 60 set to indicate that internet video or television video, as appropriate, is in the main area of the display 12. If internet video is in the PIP area and television video is in the main area before the swap so that internet video is in the main area and television video is in the PIP area after the swap, the internet video after the swap may be wrapped around the PIP area so that none of the internet communication being displayed is covered over by the PIP area. This wrapping may be implemented by the internet module 34 itself, or the television controller 32 may implement wrapping by suitable control of the video processor 40 and the raster control 44. This wrapping capability provides a distinct advantage over set top box type web televisions.

A block 222 determines whether the event is an user instruction or an internet module 34 request to place internet video from the internet module 34 in the main area of the display 12. If so, a block 224 transmits a message to the audio/video switch 36 in order to place internet video from the internet module 34 in the main area of the display 12. The block 224 also transmits, to the internet module 34, the message 60 with the third bit of the message 60 set to indicate that internet video from the internet module 34 should be in the main area of the display 12.

A block 226 determines whether the event is an user instruction or an internet module 34 request to place television video from the tuner 48 in the main area of the display 12. If so, a block 228 transmits a message to the audio/video switch 36 in order to place television video from the tuner 48 in the main area of the display 12. The block 228 also transmits, to the internet module 34, the message 60 with the third bit of the message 60 set to indicate that television video from the tuner 48 should be in the main area of the display 12.

A block 230 determines whether the event is an user instruction to connect television audio from the tuner 48 to the speakers of the web television 10. If so, a block 232 transmits a message to the audio/video switch 36 in order to connect television audio from the tuner 48 to the speakers of the web television 10. The block 232 also transmits, to the internet module 34, the message 60 with the fourth bit of the message 60 set to indicate that television audio from the tuner 48 is connected to the speakers of the web television 10.

A block 234 determines whether the event is an user instruction to connect internet audio from the internet module 34 to the speakers of the web television 10. If so, a block 236 transmits a message to the audio/video switch 36 in order to connect internet audio from the internet module 34 to the speakers of the web television 10. The block 236 also transmits, to the internet module 34, the message 60 with the fourth bit of the message 60 set to indicate that internet audio from the internet module 34 is connected to the speakers of the web television 10.

A block 238 determines whether the event is a click of a trakball of a trakball remote control device 20, of an enter key of a keyboard or other remote control device 20, or the like. If so, a block 240 sends the message 70 to the internet module 34 to indicate the click. A block 242 determines whether the event is a change in cursor position as selected by use of a trakball of a trakball remote control device 20, by arrow keys of a keyboard or other remote control device 20, or the like. If so, a block 244 transmits the message 80 in order to transmit the displacement information to the internet module 34. A block 246 determines whether the event is a key stroke of a keyboard remote control device 20. If so, a block 248 transmits the message 90 in order to transmit the last keystroke and the current keystroke to the internet module 34.

A block 250 determines whether the event is a request from the internet module 34 for the version of the software executed by the television controller 32. If so, a block 252 transmits, to the internet module 34, the message 100 containing the revision and version numbers of the software executed by the television controller 32.

Polling is a timed event. When a timed event occurs, or if the television controller 32 otherwise determines to read information from the internet module 34, a block 300 initiates the transmission of an appropriate message such as the message 110 or the message 120. A block 302 awaits the receipt of the bytes subsequent to the read slave address byte of the message 110 or the message 120. As each byte subsequent to the read slave address byte of the message 110 or the message 120 is received by the television controller 32, a block 304 appropriately processes the received data and transmits acknowledgements.

Figure 14:
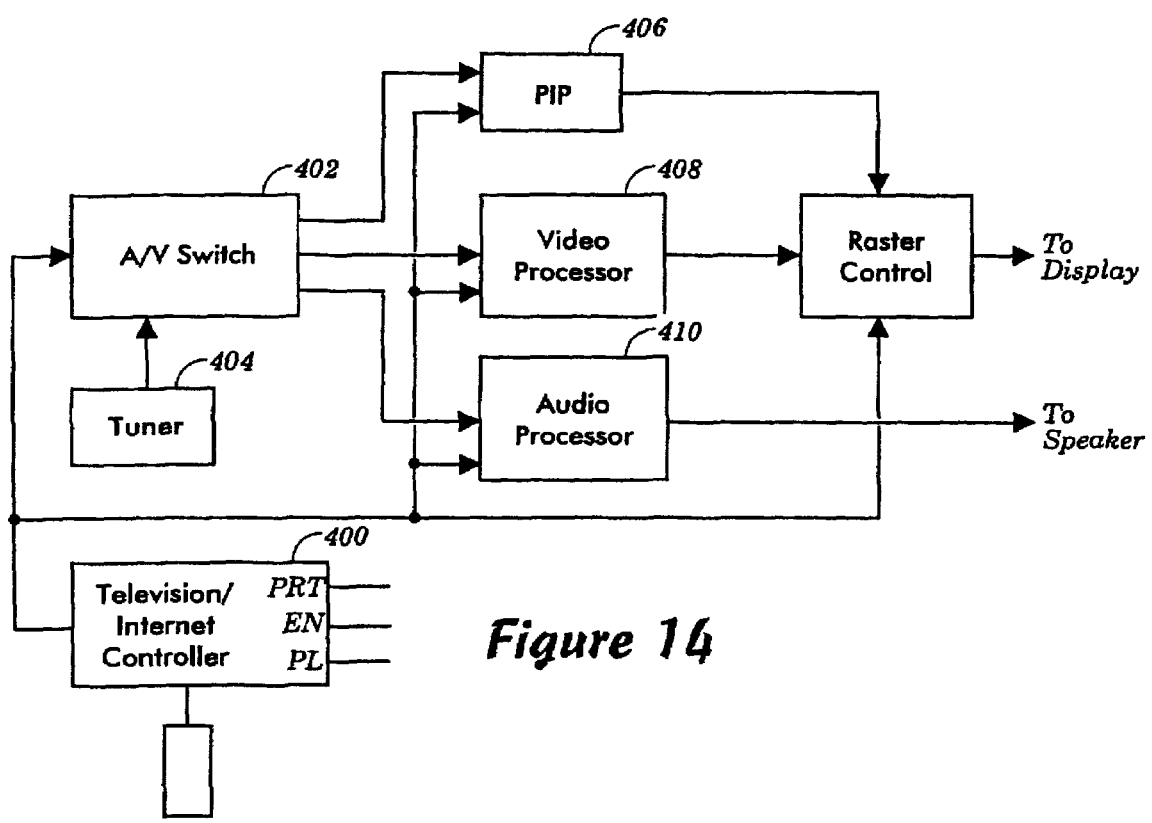

As shown in FIG. 14, the functions of the television controller 32 and of the internet module 34 may be integrated within the same processing block, such as a television/internet controller 400. The television/internet controller 400 communicates with on-line content providers and provides internet communications to an audio/video switch 402. The audio/video switch 402 also receives television signals as selected by a tuner 404. As in the case of the audio/video switch 36, the audio/video switch 402 provides internet and/or television video to a PIP module 406 and to a video processor 408, and provides internet and/or television audio to an audio processor 410. The television/internet controller 400 suitably controls the audio/video switch 402, the PIP module 406, the video processor 408, the audio processor 410, and a raster control 44 in the same fashion as is described in connection with FIG. 2. The television/internet controller 400 may be microprocessor based and programmed to incorporate all of the functions described above in connection with the television controller 32 and the internet module 34.

Certain modifications of the present invention have been discussed above. Other modifications will occur to those practicing in the art of the present invention. For example, each portion of the messages 60, 70, 80, 90, 100, 110, and 120 is described above as a single byte. Instead, each portion of the messages 60, 70, 80, 90, 100, 110, and 120 may be comprised of several bytes or one or more other data units.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A web television comprising:
   a display;
   a tuner arranged to select television video for display on the display;
   an internet module arranged to supply internet video for display on the display, wherein the internet video is derived from internet communications between the web television and internet content providers;
   a television controller arranged to control the display;
   a communication bus arranged to interconnect the internet module and the television controller in order to support two-way communication between the internet module and the television controller, wherein one or more communications that are generated by the television controller for transmission via the communication bus comprise mode information indicating in which of a set of one or more modes that the web television is operating;
   a PIP module arranged to provide a PIP area of the display; and,
   a switching means for switching the PIP area between the internet video and the television video, wherein the internet module sends a request for switching the PIP area to the television controller, and wherein the mode information is not included in the internet communications between the web television and the internet content providers.

2. A method of displaying video in a web television, the method comprising:
   transmitting a first control signal to a tuner to select television video for display on a display;
   transmitting a second control signal to an internet module to provide internet video for display on the display, wherein the internet video is derived from internet communications between the web television and internet content providers;
   transmitting mode information to the internet module via a two-way communication bus, the mode information indicating one or more modes that the web television is operating;
   displaying at least one of the television video and internet video on the display;
   providing a PIP area of the display; and,
   switching the PIP area between the internet video and the television video when a request for switching the PIP area is received from the internet module, wherein the mode information is not included in the internet communications between the web television and the internet content providers.

3. A web television comprising:
   a display;
   a tuner arranged to select television video for display on the display;
   an internet module arranged to supply internet video for display on the display, wherein the internet video is derived from internet communications between the web television and internet content providers;
   a television controller arranged to control the display; and,
   a communication bus arranged to interconnect the internet module and the television controller in order to support two-way communication between the internet module and the television controller, wherein one or more communications that are generated by the television controller for transmission via the communication bus comprise mode information indicating in which of a set of one or more modes that the web television is operating, and wherein the mode information comprises information indicating whether a PIP mode is on or off;
   a PIP module arranged to provide a PIP area of the display; and,
   a switch, wherein the switch is arranged to switch the PIP area between the internet video and the television video, wherein the internet module sends a request for switching the PIP area to the television controller, and wherein the mode information is included in the internet communications between the web television and the internet content providers.

4. A method of displaying video in a web television, the method comprising:
   transmitting a first control signal to a tuner to select television video for display on a display;
   transmitting a second control signal to an internet module to provide internet video for display on the display, wherein the internet video is derived from internet communications between the web television and internet content providers; transmitting mode information to the internet module via a two-way communication bus, the mode information indicating one or more modes that the web television is operating; and,
   displaying at least one of the television video and internet video on the display, wherein the mode information comprises information indicating whether a PIP mode is on or off;
   providing a PIP area of the display; and,
   switching the PIP area between the internet video and the television video when a request for switching the PIP area is received from the internet module, wherein the mode information is not included in the internet communications between the web television and the internet content providers.

* * * * *